United States Patent
Liu et al.

(10) Patent No.: US 9,459,735 B2
(45) Date of Patent: Oct. 4, 2016

(54) ELECTRODE PATTERN STRUCTURE OF A CAPACITIVE TOUCH PANEL AND METHOD OF MANUFACTURING THE SAME

(75) Inventors: Chen-Yu Liu, Jhong Li (TW); Lu-Hsing Lee, Longtan Shiang (TW)

(73) Assignee: TPK TOUCH SOLUTIONS INC. (TW)

( * ) Notice: Subject to any disclaimer, the term of this patent is extended or adjusted under 35 U.S.C. 154(b) by 1483 days.

(21) Appl. No.: 12/876,238

(22) Filed: Sep. 7, 2010

(65) Prior Publication Data

US 2011/0221687 A1    Sep. 15, 2011

(30) Foreign Application Priority Data

Mar. 10, 2010   (TW) .............................. 99106901 A (51) Int. Cl.
*G06F 3/044* (2006.01)
*G02F 1/1333* (2006.01)

(52) U.S. Cl.
CPC ........... *G06F 3/044* (2013.01); *G02F 1/13338* (2013.01); *G06F 2203/04103* (2013.01); *G06F 2203/04111* (2013.01); *Y10T 29/49117* (2015.01)

(58) Field of Classification Search
CPC ...... G06F 3/044; G06F 3/0412; G06F 3/045; G06F 3/041; G06F 3/0416; G06F 3/03545; G06F 3/0202; G06F 3/047; G06F 3/03547; G06F 2203/04111; G06F 2203/04103; G06F 2203/04107; G06F 2203/04106; G06F 2203/04104; G06F 2203/04112; G06F 2203/04113; G06F 2203/04105; G06F 1/1692; H03K 17/962; H03K 2017/9602; H03K 2017/960755; G09G 2300/0426; H01L 27/323; H05K 3/10; H05K 3/361; H04M 2250/22
See application file for complete search history.

(56) References Cited

U.S. PATENT DOCUMENTS

| | | | |
|---|---|---|---|
| 5,915,285 A * | 6/1999 | Sommer | 73/865.7 |
| 2005/0046622 A1 | 3/2005 | Nakanishi | |
| 2008/0062139 A1* | 3/2008 | Hotelling et al. | 345/173 |
| 2009/0140990 A1 | 6/2009 | Chang | |
| 2009/0174681 A1 | 7/2009 | Chang | |
| 2010/0007616 A1* | 1/2010 | Jang | 345/173 |
| 2010/0171718 A1* | 7/2010 | Denda | 345/173 |
| 2010/0182259 A1* | 7/2010 | Jung | G06F 3/044 345/173 |
| 2010/0182272 A1* | 7/2010 | Kang et al. | 345/174 |
| 2011/0032207 A1* | 2/2011 | Huang et al. | 345/174 |
| 2011/0157086 A1* | 6/2011 | Ozeki | G06F 3/044 345/174 |

FOREIGN PATENT DOCUMENTS

CN          101441545 A    5/2009

OTHER PUBLICATIONS

Merriam Webster Dictionary; Source: http://www.merriam-webster.com/dictionary/translucent Wayback machine snapshot from Feb. 20, 2010.*

* cited by examiner

*Primary Examiner* — Nalini Mummalaneni (74) *Attorney, Agent, or Firm* — Cooper Legal Group, LLC (57) ABSTRACT

An electrode pattern structure of a capacitive touch panel is provided. The electrode pattern structure of a capacitive touch panel of the present invention, in one embodiment, comprises a substrate, at least one first electrode disposed on said substrate, an insulator disposed on said at least one first electrode, at least one second electrode disposed on said insulator and overlapped with said at least one first electrode at least one intersection, and at least one protective block located on said at least one second electrode and positioned at said at least one intersection.

24 Claims, 9 Drawing Sheets

FIG. 1

(Prior Art)

FIG. 2

(Prior Art)

ELECTRODE PATTERN STRUCTURE OF A CAPACITIVE TOUCH PANEL AND METHOD OF MANUFACTURING THE SAME

FIELD OF THE INVENTION

This application claims the benefit of Taiwan application No. 099106901, filed Mar. 10, 2010.

The present invention relates to an electrode pattern structure of a capacitive touch panel for a touch input device and method of manufacturing the same.

BACKGROUND OF THE INVENTION

There exist today many designs of input devices for performing operations in a consumer electronic device. The movement of a conductive object such as a finger or stylus along a surface of the touch device is detected by the touch device to generate electrical signal for the subsequent process.

The touch sensing method may be based on resistive sensing, capacitive sensing, acoustic waving sensing, pressure sensing, optical sensing and the like. A touch on the surface of capacitive touch panel by a conductive object such as a finger or stylus results in the change in capacitance corresponding to the location of the touch. A processor connected to the touch panel interprets the coordinate of the touch depending on the change in capacitance.

Figure 1:
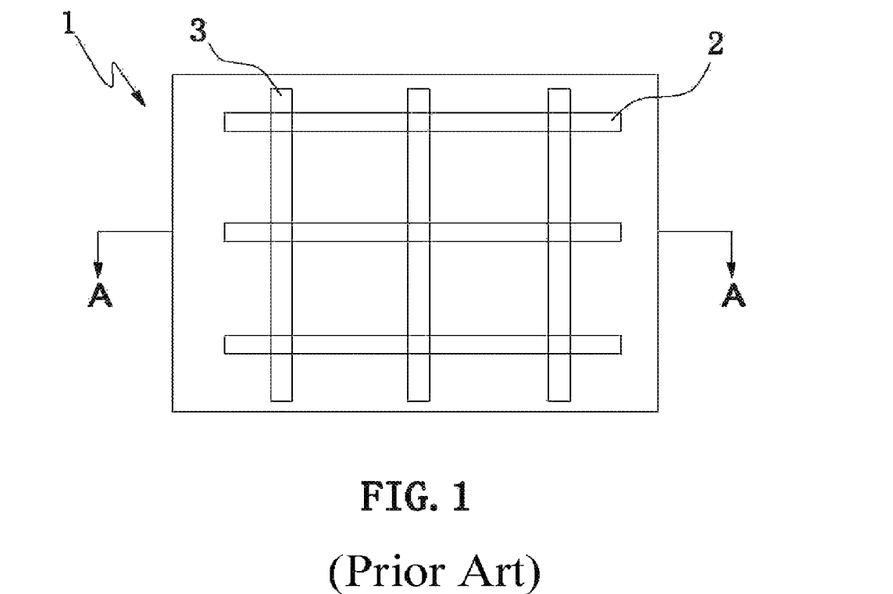
FIG. 1 is a schematic top view of a conventional projective capacitive touch panel.
Figure 2:
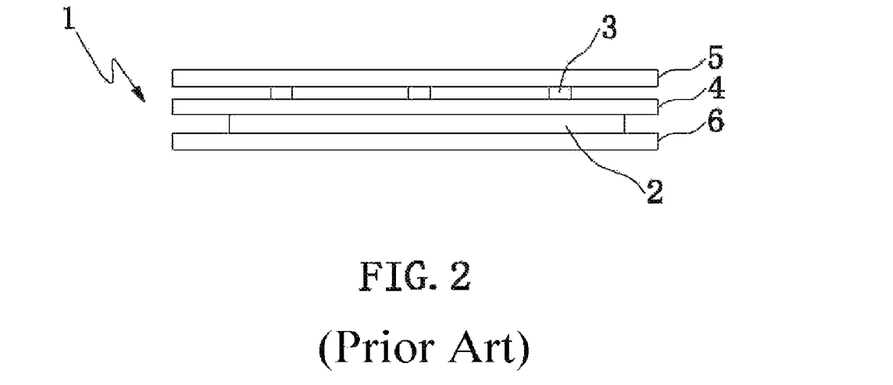
FIG. 2 is a schematic sectional view taken on the line A-A of FIG. 1.

A projective capacitive touch panel acting as a common type of capacitive touch panel normally includes a lattice electrode pattern. Referring to FIG. 1 and FIG. 2, the projective capacitive touch panel 1 comprising a substrate 6, a plurality of first electrodes 2, a plurality of second electrodes 3, insulator 4 and protective layer 5. The plurality of first electrodes 2 and the plurality of second electrodes 3 are intersected with each other to form a lattice pattern placed on the substrate 2. The insulator 4 is arranged between the two electrodes at the intersection of the plurality of first electrodes 2 and the plurality of second electrodes 3. The protective layer 5 covers all electrodes and insulator to protect them from been damaged. Also, a processor (not shown) is connected to the plurality of first electrodes 2 and the plurality of second electrodes 3. When a conductive object such as a finger or stylus is touching or moving on the projective capacitive touch panel, the signals associated with the electrodes is detected and transferred to the processor to interpret the position of the conductive object.

However, it is preferred that the capacitive touch panel, integrated with luminous device such as a display, be made of transparent materials since the lattice pattern is disposed on the visual area of display. The touch panel contains several layers of material with different refractive indexes. As a result, the light transmission of touch panel is limited, and the visibility of display is reduced. In addition, the protective layer in the conventional capacitive touch panel is of plane continuous structure to protect the weak intersection of electrodes. The amount of material used to make the protective layer is sizeable.

Thus, there is a need to improve on light transmission and material utilization of touch panels.

SUMMARY OF THE INVENTION

It is an object of the present invention to provide an electrode pattern structure of a capacitive touch panel that increase the light transmission of capacitive touch panel and reduce the material cost.

The electrode pattern structure of a capacitive touch panel of the present invention, in one embodiment, comprises a substrate, at least one first electrode disposed on said substrate, an insulator disposed on said at least one first electrode, at least one second electrode disposed on said insulator and overlapped with said at least one first electrode at least one intersection, and at least one protective block located on said at least one second electrode and positioned at said at least one intersection.

In another embodiment, said at least one first electrode comprises at least two separate first conductor cells and at least one first conductive line connecting said at least two separate first conductor cells, and said at least one second electrode comprises at least two separate second conductor cells and at least one second conductive line connecting said at least two separate second conductor cells. Said at least one first conductive line overlap with said at least one second conductive line at said at least one intersection. Said insulator is positioned between said at least one first conductive line and said at least one second conductive line.

It is another object of the present invention to provide a method of manufacturing an electrode pattern structure.

The method of manufacturing an electrode pattern structure comprises: laying said at least one first electrode on said substrate; placing said at least one insulator piece on said at least one first electrode; having said at least one second electrode cross over said at least one insulator piece on said substrate to insulate said at least one second electrode from said at least one first electrode; placing said at least one protective block on said at least one second electrode at said at least one intersection.

In the present invention, the protective block is used instead of the conventional plane continuous protective layer to improve light transmission of the capacitive touch panel. In addition, another advantage of using the protective block is the reduction of material cost.

DETAILED DESCRIPTION OF THE EMBODIMENTS

Figure 3:
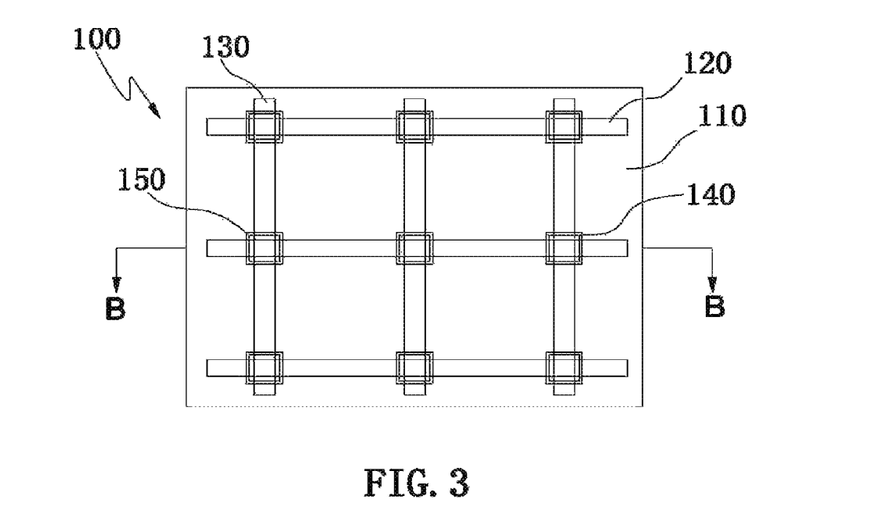
FIG. 3 is a schematic top view of one embodiment of the present invention.
Figure 4:
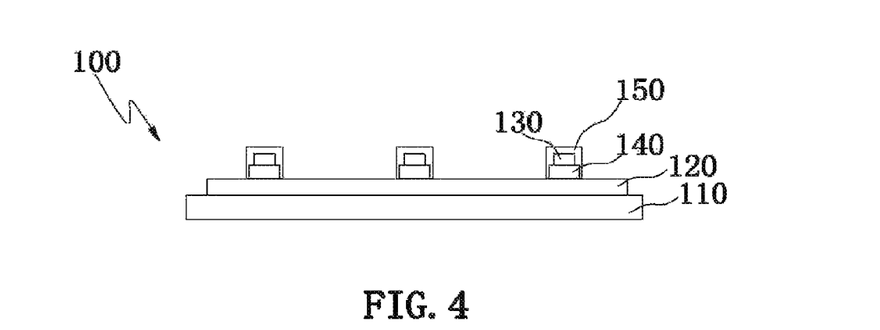
FIG. 4 is a schematic sectional view taken on the line B-B of FIG. 3.

Referring to FIG. 3 and FIG. 4, an electrode pattern structure of a capacitive touch panel 100 comprises a substrate 110, a plurality of first electrodes 120, a plurality of second electrodes 130, a plurality of insulators 140 and a plurality of protective blocks 150. The first electrodes 120 intersected with the second electrodes 130 are disposed on the substrate 110. The insulators 140 are arranged on the first electrodes 120. The second electrodes 130 cross over the insulators 140. The protective blocks 150 located on the plurality of second electrodes are positioned at the intersection of the first electrodes 120 and the second electrodes 130. The insulators 140 located between the first electrodes 120 and the second electrodes 130 to insulate the first electrodes 120 and the second electrodes 130.

Figure 5:
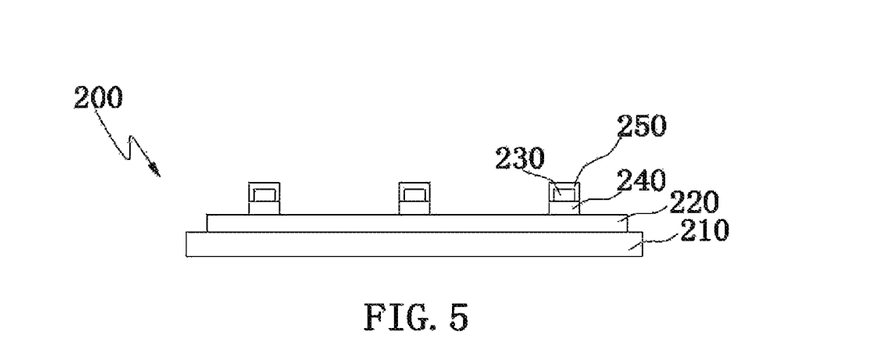
FIG. 5 is a schematic sectional view of the second embodiment of the present invention.

In practice, according to different requirements during manufacturing process, the protective blocks 150 could cover the insulators 140 as well as the part of the second electrodes 130 overlapped with the insulators 140. Also, as shown in FIG. 5, the protective blocks 250 in the second embodiment of the present invention stack up on the insulators 240 and only cover the part of the second electrodes 230 overlapped with the insulators 240.

Figure 6:
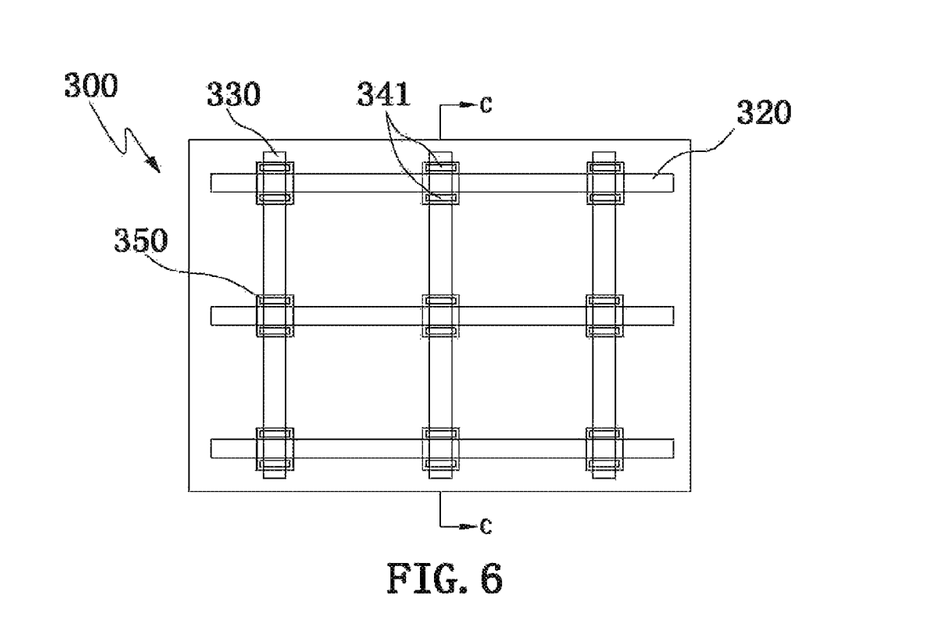
FIG. 6 is a schematic top view of the third embodiment of the present invention.
Figure 7:
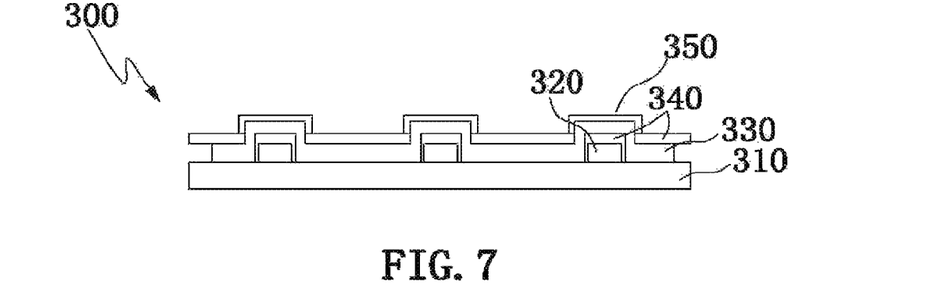
FIG. 7 is a schematic sectional view taken on the line C-C of FIG. 6.

FIGS. 6 and 7 illustrate the third embodiment of the present invention. The electrode pattern structure 300 of a capacitive touch panel comprises a substrate 310, a plurality of first electrodes 320, a plurality of second electrodes 330, an insulator 340 and a plurality of protective blocks 350. Being different from the electrode pattern structure 100, the insulator 340 in the electrode pattern structure 300 is provided with a plurality of pairs of holes 341. Each pair of holes 341, on the insulator 340, is situated on the two opposite sides of the first electrodes 320. The second electrodes 330 go through the pairs of holes 341 at the intersection of the first electrodes 320 and the second electrodes 330. The part of the second electrodes 330 located between the pairs of holes 341 is disposed on one side of the insulator 340, while the first electrodes 320 and rest part of the second electrodes 330 are disposed on another side of the insulator 340. Thus, the first electrodes 320 are insulated from the second electrodes 330 by the insulator 340. The protective blocks 350 cover the part of the second electrodes 330 located between the pairs of holes 341.

Figure 8:
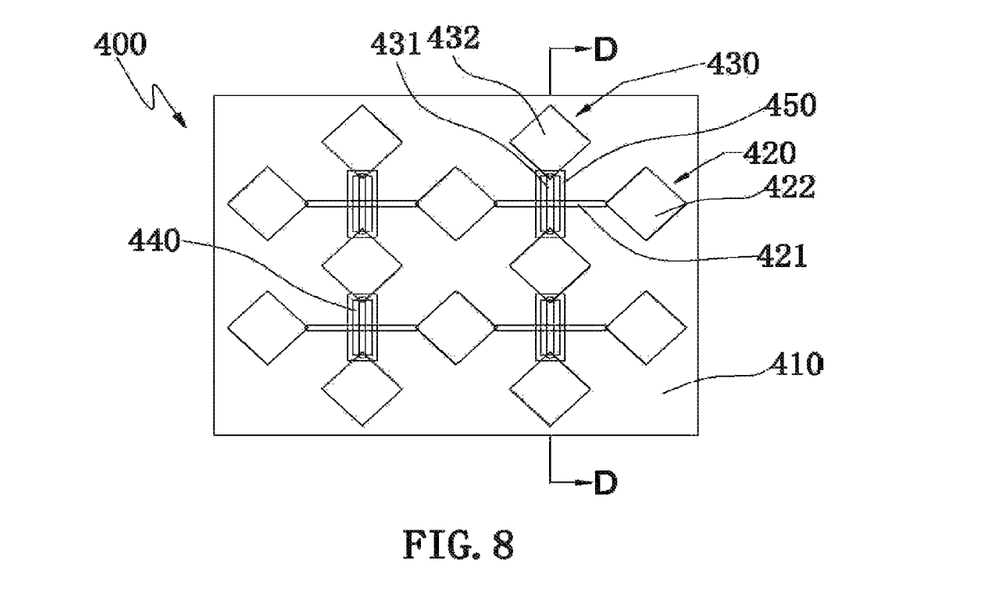
FIG. 8 is a schematic top view of the fourth embodiment of the present invention.
Figure 9:
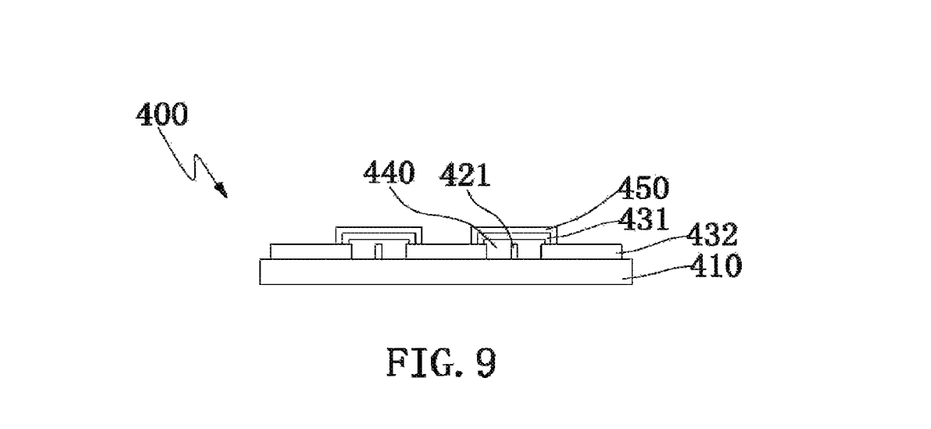
FIG. 9 is a schematic sectional view taken on the line D-D of FIG. 8.

The fourth embodiment of the electrode pattern structure 400 of a capacitive touch panel, as shown in FIGS. 8 and 9, includes a substrate 410, a plurality of first electrodes 420, a plurality of second electrodes 430, a plurality of insulators 440 and a plurality of protective blocks 450. Being different from the electrode pattern structure 100, the first electrodes 420 comprise a plurality of first conductor cells 422 and a plurality of first conductive lines 421, while the second electrodes 430 comprise a plurality of second conductor cells 432 and a plurality of second conductive lines 431. Furthermore, the first conductor cells 422 are separated from each other and connected by the first conductive lines 421, and the second conductor cells 432 are separated from each other and connected by the second conductive lines 431. The insulators 440 are positioned between the first conductive lines 421 and the second conductive lines 431 to insulate the first electrodes 420 from the second electrodes 430.

Figure 10:
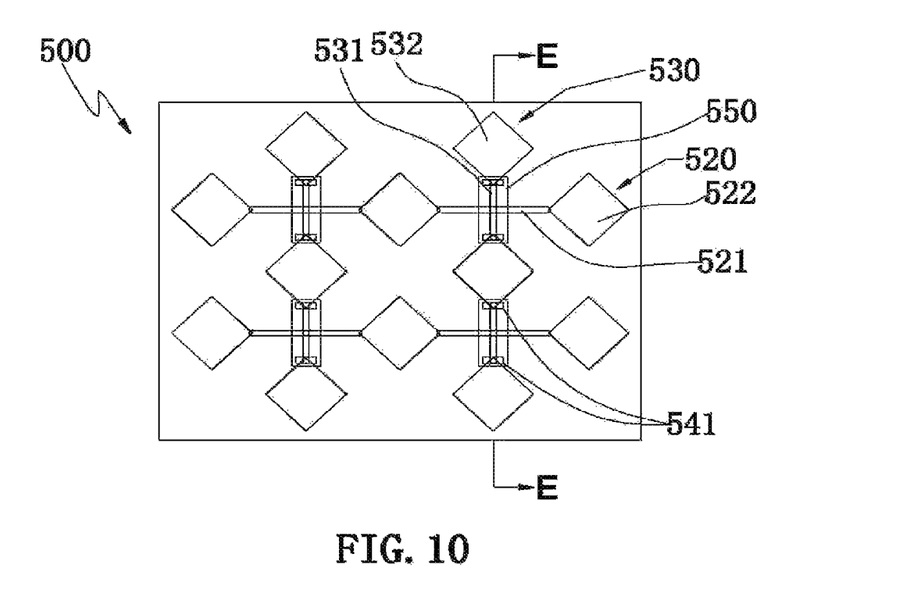
FIG. 10 is a schematic top view of the fifth embodiment of the present invention.
Figure 11:
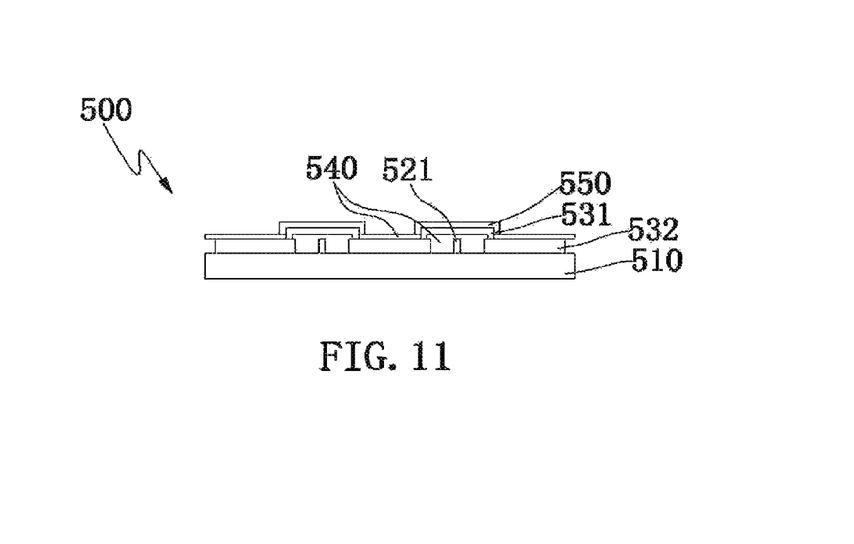
FIG. 11 is a schematic sectional view taken on the line E-E of FIG. 10.
Figure 12A:
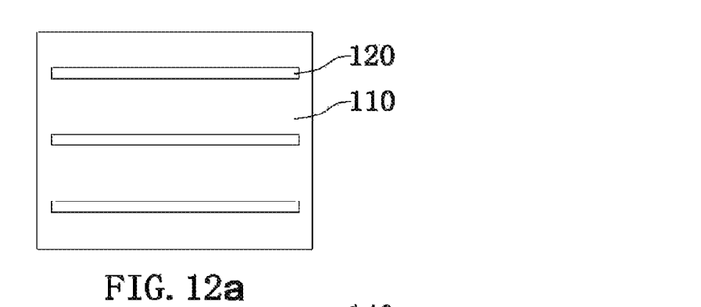
FIG. 12a-12d is a schematic flow diagram of one process of manufacturing the embodiment of the present invention of FIG. 3.
Figure 12B:
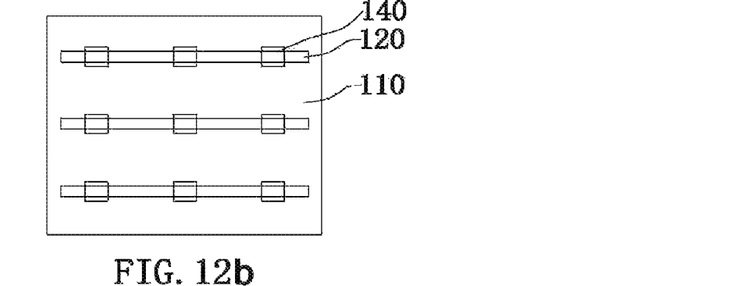
Figure 12C:
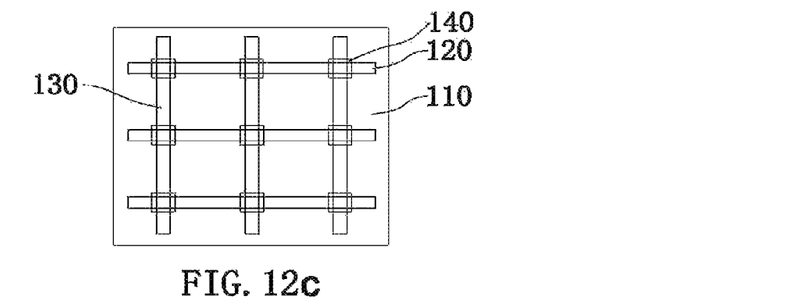
Figure 12D:
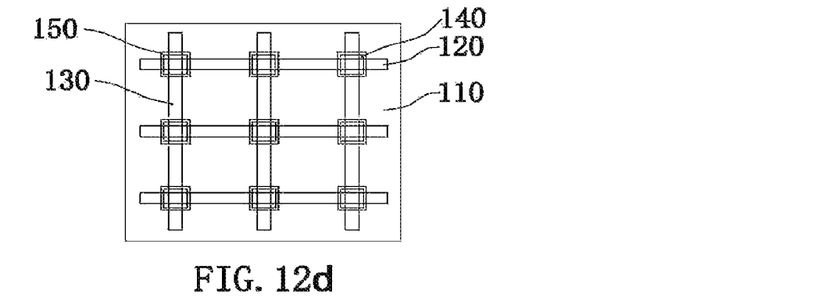
Figure 13A:
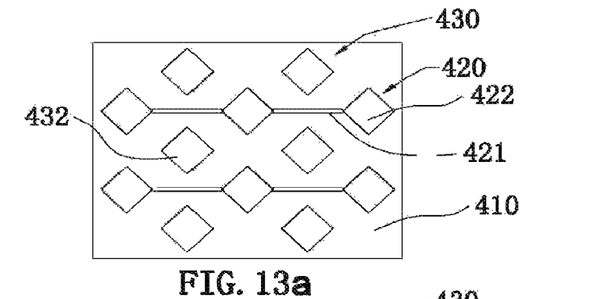
FIG. 13a-13d is a schematic flow diagram of one process of manufacturing the fourth embodiment of the present invention of FIG. 8.
Figure 13B:
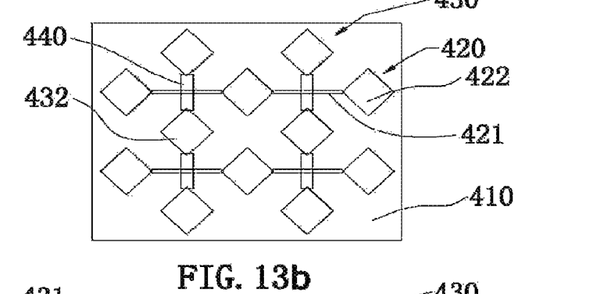
Figure 13C:
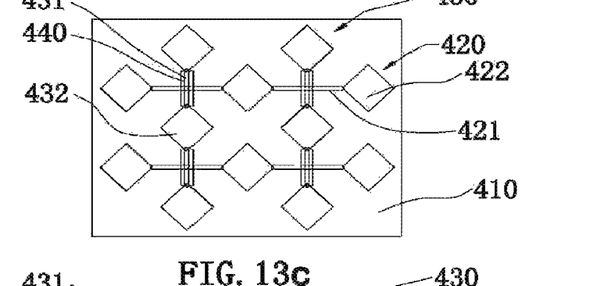
Figure 13D:
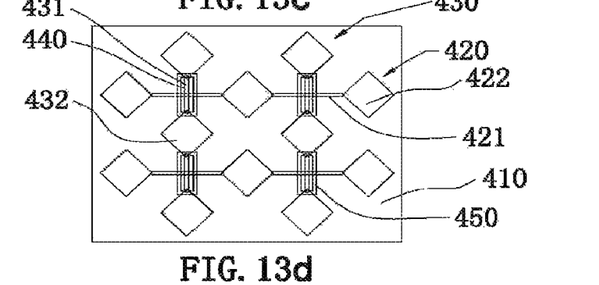
Figure 14A:
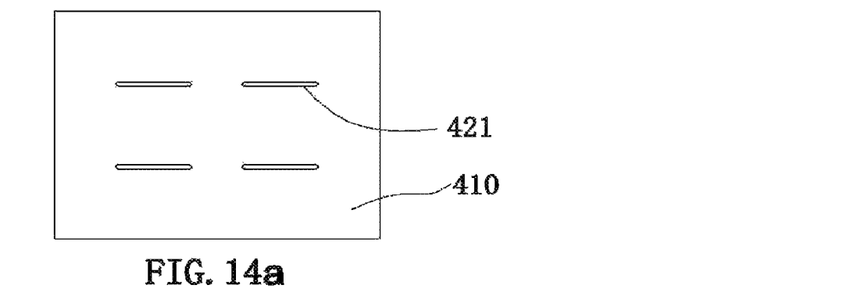
FIG. 14a-14d is a schematic flow diagram of another process of manufacturing the fourth embodiment of the present invention of FIG. 8.
Figure 14B:
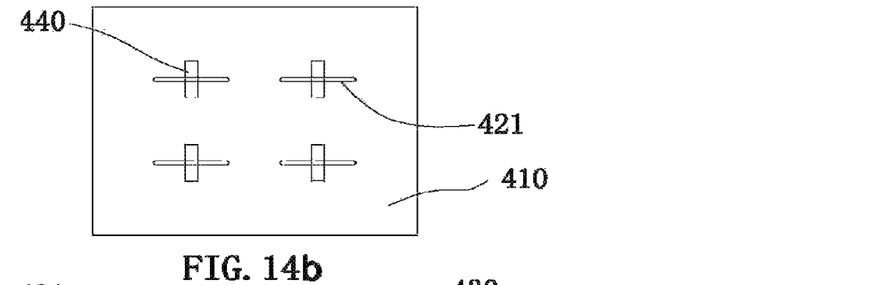
Figure 14C:
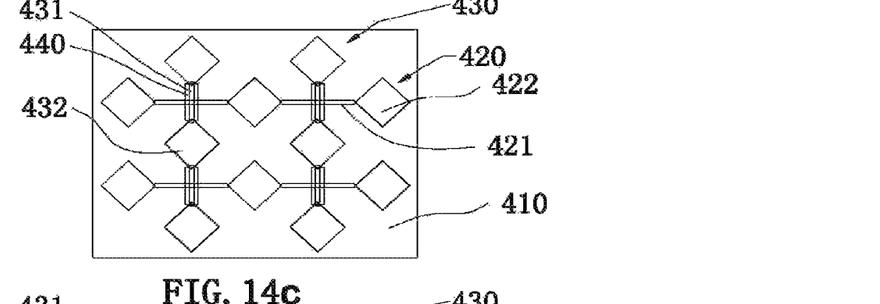
Figure 14D:
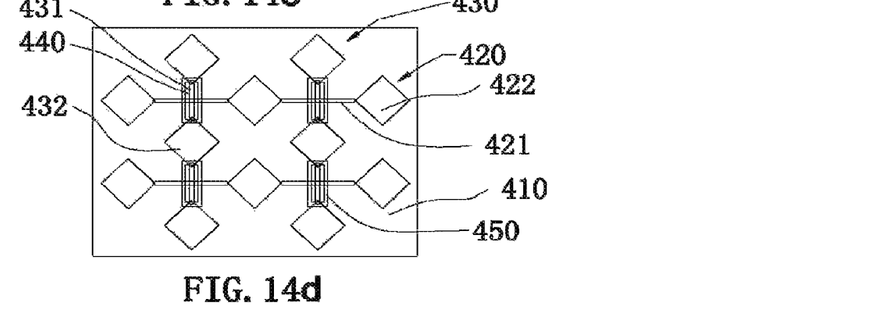

FIGS. 10 and 11 shows the fifth embodiment of the present invention. The electrode pattern structure 500 of a capacitive touch panel comprises a substrate 510, a plurality of first electrodes 520, a plurality of second electrodes 530, an insulator 540 and a plurality of protective blocks 550. Being different from the electrode pattern structure 300, the first electrodes 520 comprise a plurality of first conductor cells 522 and a plurality of first conductive lines 521, while the second electrodes 530 comprise a plurality of second conductor cells 532 and a plurality of second conductive lines 531. Furthermore, the first conductor cells 522 are separated from each other and connected by the first conductive lines 521, and the second conductor cells 532 are separated from each other and connected by the second conductive lines 531. The first conductor cells 522, the first conductive lines 521 and the second conductor cells 532 form on the one side of the insulator 540. The insulator 540 is provided with a plurality of pairs of holes 541 situated on the two opposite sides of the first conductive lines 521. The pairs of holes 541 are positioned over the second conductor cells 532 to expose the part of the second conductor cells 532. The second conductive lines 531 are disposed on another side of the insulator 540, and connect the exposed part of the second conductor cells 532. As a result, the first electrodes 520 are insulated from the second electrodes 530. The protective blocks 550 form on the insulator 540 and cover the second conductive lines 531.

Applied in various touch devices, the electrode pattern structure of the capacitive touch panel may be opaque, e.g. the touch pads of the laptop computer. By virtue of the protective blocks, the material is saved and the cost is reduced. Also, the electrodes pattern structure of the capacitive touch panel may be transparent, e.g. the touch screen of the cell phone. Instead of the conventional plane protective layer, with the protective blocks, the light transmission of the whole capacitive touch panel is improved and the material is saved. The opaque conducting material could be selected from copper, alumina, gold and other metal, while the transparent conducting material could be Indium Tin Oxides (ITO), Aluminum-doped zinc Oxide, transparent conductive oxides and so on. The protective blocks can be made of insulation material, such as plastic.

FIG. 12 illustrate a process of manufacturing the embodiment of the present invention shown in FIG. 3. Firstly, laying a plurality of first electrodes 120 on the substrate 110, shown in FIG. 12a. Secondly, placing a plurality of insulators 140 on the first electrodes 120, shown in FIG. 12b. Thirdly, laying a plurality of second electrodes 130 on the substrate 110; the second electrodes 130 cross over the insulators 140 and is insulated from the first electrodes 120, shown in FIG. 12c. Fourthly, placing a plurality of protective blocks 150 on the second electrodes 130 at the intersection of the first electrodes 120 and the second electrodes 130; the protective blocks 150 cover the insulators 140 and the part of the second electrodes 130 overlapped with the insulators 140, shown in FIG. 12d.

FIG. 13 illustrate one process of manufacturing the fourth embodiment of the present invention shown in FIG. 8. Firstly, laying a plurality of first conductor cells 422, a plurality of first conductive lines 421 and a plurality of second conductor cells 432 on the substrate 410; the first separate conductor cells 422 are connected by the first conductive lines 421, FIG. 13*a*. Secondly, placing a plurality of insulators 440 on the first conductive lines 421, FIG. 13*b*. Thirdly, laying a plurality of second conductive lines 431 on the insulators 440; the second separate conductor cells 432 are connected by the second conductive lines 431, FIG. 13*c*. Fourthly, placing a plurality of protective blocks 450 on the second conductive lines 431; the protective blocks 450 cover the insulators 440 and the second conductive lines 431 overlapped with the insulators 440, FIG. 13*d*.

FIG. 14 illustrate another process of manufacturing the fourth embodiment of the present invention shown in FIG. 8. Firstly, laying a plurality of first conductive lines 421 on the substrate 410, FIG. 14*a*. Secondly, placing a plurality of insulators 440 on the first conductive lines 421, FIG. 14*b*. Thirdly, laying a plurality of first conductor cells 422 and a plurality of second conductor cells 432 on the substrate 410, while laying a plurality of second conductive lines 431 on the insulators 440, FIG. 14*c*. Fourthly, placing a plurality of protective blocks 450 on the second conductive lines 431 to cover the insulators 440 and the second conductive lines 431 overlapped with the insulators 440, FIG. 14*d*.

The process of manufacturing the fifth embodiment of the present invention shown in FIG. 10 is similar to that shown in FIG. 8. The difference is the insulator 540 having a plurality of pairs of holes 541 situated on the two opposite sides of the first conductive lines 521.

In view of different manufacturing facilities, various application surroundings and different process requirement, the photolithography or the printing techniques, including but not limited to screen printing, ink jet printing, aerosol printing, can be inducted into the manufacture process mentioned above to make the electrode pattern structure of a capacitive touch panel.

Figure 15:
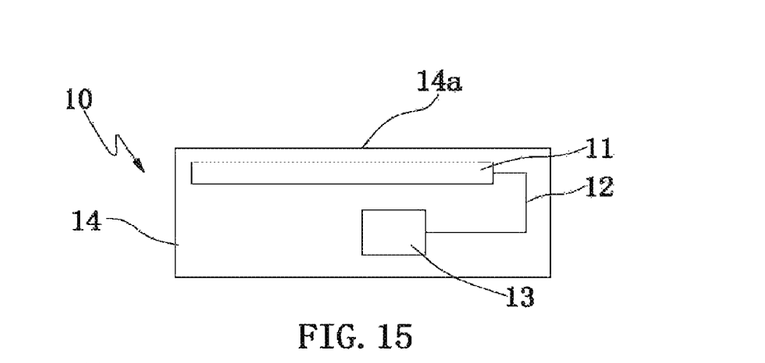
FIG. 15 is a schematic diagram of one touch device having the embodiment of the present invention.

FIG. 15 shows a touch device having the embodiment of the present invention. The capacitive touch device 10 comprises an electrode pattern structure 11, lines 12, a processor 13 and a housing 14. The housing 14 is used to hold the electrode pattern structure 11, lines 12 and the processor 13. The electrode pattern structure 11 is adjacent to an internal surface 14*a* of the housing 14. The first electrodes and the second electrodes (not shown) are connected to the processor 13 by the lines 12. When a conductive object touches the external surface of the housing opposite to the internal surface 14*a*, an electric signal generates on the electrode pattern structure 11 and is transferred to the processor 13 by the lines 12. The processor 13 interprets the coordinate of the touch point of the conductive object.

Figure 16:
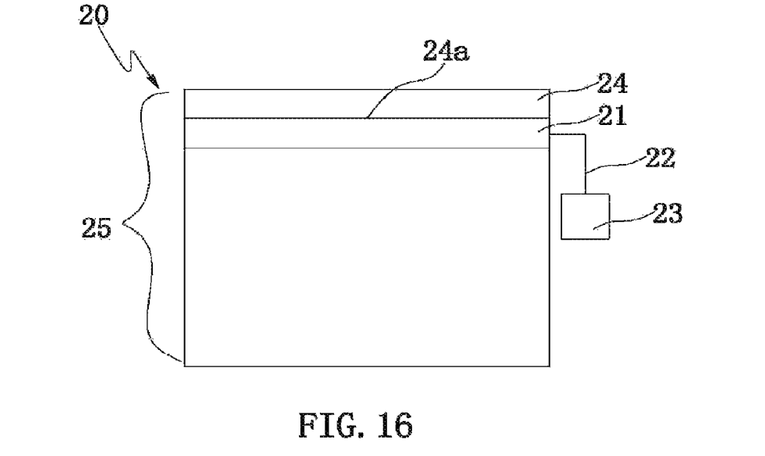
FIG. 16 is a schematic diagram of another touch device having the embodiment of the present invention.

The transparent capacitive touch panel having the present electrode pattern structure may be integrated with the display, such as the liquid crystal display. As shown in FIG. 16, the touch device 20 includes a display 25 having a polarizer 24, a transparent electrode pattern structure 21, lines 22 and a processor 23. The transparent electrode pattern structure 21 set into the display 25 and is adjacent to the internal surface 24*a* of the polarizer 24. The first electrodes and the second electrodes (not shown) are connected to the processor 23 by the lines 22. The conductive object touches the polarizer 24 to operate the touch device 20.

Figure 17:
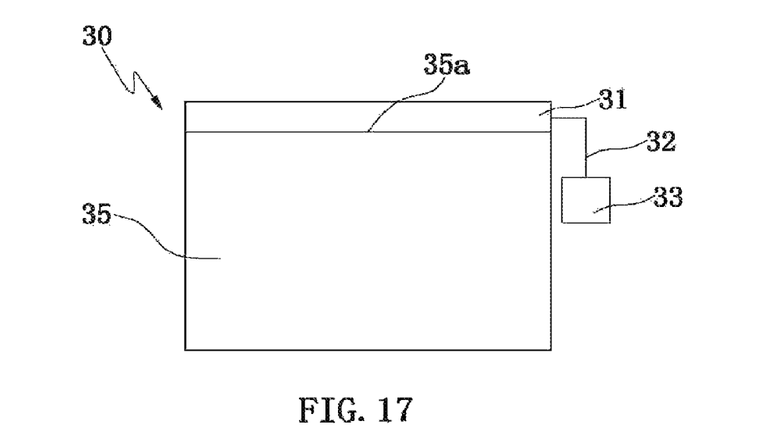
FIG. 17 is a schematic diagram of another touch device having the embodiment of the present invention.

FIG. 17 illustrates another touch device 30 having the present electrode pattern structure may be integrated with the display, such as the liquid crystal display. The touch device 30 comprises a display 35, a transparent electrode pattern structure 31, lines 32 and a processor 33. The transparent electrode pattern structure 31 is placed on the external surface 35*a* of the display 35. The first electrodes and the second electrodes (not shown) are connected to the processor 33 by the lines 32.

Any embodiments of the electrode pattern structure of capacitive touch panel illustrated in the present invention could be utilized into the touch device mentioned above.

The number of the first electrodes and the second electrodes in the present invention is at least one electrode. The resolution and the size of the capacitive touch panel is the main factor influencing the number of electrodes. Normally, the higher resolution or the larger size it is required, the more electrodes are needed. The number of the insulators, the pairs of holes in insulator and the protective blocks is determined by the number of the first electrodes and the second electrodes.

Although the present invention has been described with reference to the embodiments thereof and the best modes for carrying out the present invention, it is apparent to those skilled in the art that a variety of modifications and changes may be made without departing from the scope of the present invention. Accordingly, it is to be understood that the present invention has been described by way of illustration and not limitations.

What is claimed is:

1. An electrode pattern structure of a touch panel, comprising:
    a substrate;
    a plurality of first electrodes, at least one first electrode of said plurality of first electrodes disposed on said substrate;
    an insulator comprising at least one insulator piece and disposed on said at least one first electrode;
    a plurality of second electrodes, at least one second electrode of said plurality of second electrodes disposed on said at least one insulator piece and crossing over said at least one insulator piece and said at least one first electrode at at least one intersection of said at least one first electrode and said at least one second electrode, wherein said at least one insulator piece is positioned only at said at least one intersection; and
    a plurality of protective blocks, at least one protective block of said plurality of protective blocks located on said at least one second electrode and positioned only at said at least one intersection, wherein each of said protective blocks are positioned only at each of said intersections of said first electrodes and said second electrodes, and wherein said at least one protective block is transparent,
    wherein said at least one protective block stacks on said at least one insulator piece and only covers a part of said at least one second electrode overlapped with said at least one insulator piece, said at least one protective block in contact only with said at least one second electrode and said at least one insulator piece, and said at least one protective block covering a lateral surface of said at least one second electrode and a lateral surface of said at least one insulator piece.

2. The electrode pattern structure of claim 1, wherein said at least one first electrode comprises at least two separate first conductor cells and at least one first conductive line connecting said at least two separate first conductor cells, and said at least one second electrode comprises at least two separate second conductor cells and at least one second conductive line connecting said at least two separate second conductor cells, and wherein said at least one second conductive line-overlaps with said at least one first conductive line at said at least one intersection.

3. The electrode pattern structure of claim 1, wherein said substrate, said at least one first electrode, said at least one second electrode and said insulator are transparent.

4. The electrode pattern structure of claim 1, wherein at least one of the following is transparent: said substrate, said at least one first electrode, said at least one second electrode or said insulator.

5. A method of manufacturing an electrode pattern structure comprising:
    laying at least one first electrode on a substrate;
    placing at least one insulator piece on said at least one first electrode;
    laying at least one second electrode disposed on said at least one insulator piece and crossing over said at least one insulator piece and said at least one first electrode at at least one intersection of said at least one first electrode and said at least one second electrode to insulate said at least one second electrode from said at least one first electrode, wherein said at least one insulator piece is positioned only at said at least one intersection; and
    placing at least one protective block on said at least one second electrode and positioned only at said at least one intersection, wherein said at least one protective block is transparent, wherein said at least one protective block stacks on said at least one insulator piece and covers only a part of said at least one second electrode overlapped with said at least one insulator piece, and wherein said at least one protective block is in contact only with said at least one second electrode and said at least one insulator piece, and said at least one protective block covering a lateral surface of said at least one second electrode and a lateral surface of said at least one insulator piece.

6. The method of manufacturing an electrode pattern structure of claim 5, wherein laying said at least one first electrode comprises:
    laying at least two first conductor cells, at least one first conductive line and at least two second conductor cells on said substrate, wherein said at least one first conductive line connects said at least two first conductor cells;
    wherein laying said at least one second electrode comprises:
    laying at least one second conductive line on said at least one insulator piece, wherein said at least one second conductive line connects said at least two second conductor cells; and
    wherein said at least one protective block covers a lateral surface of said at least one second conductive line.

7. The method of manufacturing an electrode pattern structure of claim 5, wherein laying said at least one first electrode comprises:
    laying at least one first conductive line on said substrate;
    wherein laying said at least one second electrode comprises:
    laying at least two first conductor cells, at least two second conductor cells and at least one second conductive line, wherein said at least one first conductive line connects said at least two first conductor cells, and said at least one second conductive line is located on said at least one insulator piece and connects said at least two second conductor cells; and
    wherein said at least one protective block covers a lateral surface of said at least one second conductive line.

8. The method of manufacturing an electrode pattern structure of claim 5, wherein said electrode pattern structure is manufactured by photolithography.

9. The method of manufacturing an electrode pattern structure of claim 5, wherein said electrode pattern structure is manufactured by printing.

10. A touch device having said electrode pattern structure of claim 1 comprising:
    a plurality of lines;
    a processor; and
    a housing, wherein said electrode pattern structure is immediately adjacent to an internal surface of said housing, and wherein said plurality of lines connect said at least one first electrode and said at least one second electrode of said electrode pattern structure to said processor.

11. A touch device having said electrode pattern structure of claim 1 comprising:
    a display with a polarizer;
    a plurality of lines; and
    a processor, wherein said electrode pattern structure is immediately adjacent to an internal surface of said polarizer, and wherein said electrode pattern structure is transparent, and said plurality of lines connect said at least one first electrode and said at least one second electrode of said electrode pattern structure to said processor.

12. A touch device having said electrode pattern structure of claim 1 comprising:
    a display;
    a plurality of lines; and
    a processor, wherein said electrode pattern structure is located on said display, and wherein said electrode pattern structure is transparent, and said plurality of lines connect said at least one first electrode and said at least one second electrode of said electrode pattern structure to said processor.

13. The touch device of claim 11 or 12, wherein said display is a liquid crystal display.

14. An electrode pattern structure of a touch panel, comprising:
    a substrate;
    at least one first electrode disposed on said substrate;
    an insulator comprising an insulator piece disposed on said at least one first electrode;
    at least one second electrode disposed on said insulator piece and crossing over said insulator piece and said at least one first electrode at at least one intersection of said at least one first electrode and said at least one second electrode, wherein said insulator piece is positioned only at said at least one intersection; and
    at least one transparent protective block located on said at least one second electrode and positioned only at said at least one intersection,
    wherein said at least one protective block is disposed only on said at least one second electrode, and covers only a part of said at least one second electrode overlapped with said insulator piece, such that said at least one protective block is in contact with only said at least one second electrode and a portion of an upper surface of said insulator.

15. The electrode pattern structure of claim 14, wherein said at least one first electrode comprises at least two separate first conductor cells and at least one first conductive line connecting said at least two separate first conductor cells, and said at least one second electrode comprises at least two separate second conductor cells and at least one second conductive line connecting said at least two separate second conductor cells, and wherein said at least one second conductive line overlaps with said at least one first conductive line at said at least one intersection.

16. The electrode pattern structure of claim 14, wherein said substrate, said at least one first electrode, said at least one second electrode and said insulator are transparent.

17. The electrode pattern structure of claim 14, wherein at least one of the following is transparent: said substrate, said at least one first electrode or, said at least one second electrode or said insulator.

18. The electrode pattern structure of claim 14, wherein said at least one protective block downwardly extends to a lateral surface of said insulator piece and contacts with said upper surface of said insulator piece.

19. A method of manufacturing an electrode pattern structure comprising:
laying at least one first electrode on a substrate;
placing at least one insulator piece of an insulator on said at least one first electrode;
laying at least one second electrode crossing over said at least one insulator piece and said at least one first electrode at at least one intersection of said at least one first electrode and said at least one second electrode to insulate said at least one second electrode from said at least one first electrode, wherein said at least one insulator piece is positioned only at said at least one intersection; and
placing at least one transparent protective block on said at least one second electrode at said at least one intersection, wherein said at least one protective block is positioned only at said at least one intersection and disposed only on said at least one second electrode, and covers only a part of said at least one second electrode overlapped with said at least one insulator piece, such that said at least one protective block is in contact only with said at least one second electrode and a portion of an upper surface of said insulator.

20. The method of manufacturing an electrode pattern structure of claim 19, wherein laying said at least one first electrode comprises:
laying at least two first conductor cells, at least one first conductive line and at least two second conductor cells on said substrate, wherein said at least one first conductive line connects said at least two first conductor cells;
wherein laying said at least one second electrode comprises:
laying at least one second conductive line on said at least one insulator piece, wherein said at least one second conductive line connects said at least two second conductor cells; and
wherein said at least one protective block contacts a lateral surface of said at least one second conductive line.

21. The method of manufacturing an electrode pattern structure of claim 19, wherein laying said at least one first electrode comprises:
laying at least one first conductive line on said substrate;
wherein laying said at least one second electrode comprises:
laying at least two first conductor cells, at least two second conductor cells and at least one second conductive line, wherein said at least one first conductive line connects said at least two first conductor cells, and said at least one second conductive line is located on said at least one insulator piece and connects said at least two second conductor cells; and
wherein said at least one protective block contacts with a lateral surface of said at least one second conductive line.

22. The method of manufacturing an electrode pattern structure of claim 19, wherein said electrode pattern structure is manufactured by photolithography.

23. The method of manufacturing an electrode pattern structure of claim 19, wherein said electrode pattern structure is manufactured by printing.

24. The method of manufacturing an electrode pattern structure of claim 19, wherein said at least one protective block downwardly extends to a lateral surface of said at least one insulator piece and contacts with said lateral surface of said at least one insulator piece.

* * * * *

UNITED STATES PATENT AND TRADEMARK OFFICE
CERTIFICATE OF CORRECTION

PATENT NO.       : 9,459,735 B2                                  Page 1 of 1
APPLICATION NO.  : 12/876238
DATED            : October 4, 2016
INVENTOR(S)      : Chen-Yu Liu et al.

It is certified that error appears in the above-identified patent and that said Letters Patent is hereby corrected as shown below:

Column 9, Line 9, please delete "or said insulator".

Signed and Sealed this
Seventeenth Day of January, 2017

Michelle K. Lee
*Director of the United States Patent and Trademark Office*